(12) United States Patent
Shoji

(10) Patent No.: US 8,054,486 B2
(45) Date of Patent: Nov. 8, 2011

(54) FACSIMILE APPARATUS, CONTROL METHOD THEREOF, AND CONTROL PROGRAM THEREOF

(75) Inventor: Fumio Shoji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1268 days.

(21) Appl. No.: 10/991,609

(22) Filed: Nov. 17, 2004

(65) Prior Publication Data
US 2005/0134908 A1    Jun. 23, 2005

(30) Foreign Application Priority Data

Nov. 27, 2003    (JP) ................................. 2003-396485

(51) Int. Cl.
*G06F 13/00* (2006.01)
(52) U.S. Cl. ......... 358/1.15; 358/1.1; 358/407; 358/442
(58) Field of Classification Search ................... 358/1.1, 358/1.5, 400, 407, 442, 409, 440, 1.9; 709/247
See application file for complete search history.

(56) References Cited

U.S. PATENT DOCUMENTS

| | | | |
|---|---|---|---|
| 6,753,980 B1* | 6/2004 | Sakakura et al. | 358/440 |
| 2002/0097431 A1* | 7/2002 | Ikegami | 358/1.15 |
| 2002/0194553 A1* | 12/2002 | Okamoto et al. | 714/699 |
| 2004/0036914 A1* | 2/2004 | Kropf et al. | 358/1.18 |
| 2006/0271936 A1* | 11/2006 | Matsuda et al. | 718/102 |
| 2009/0207459 A1* | 8/2009 | Bloomfield | 358/402 |

FOREIGN PATENT DOCUMENTS

| | | |
|---|---|---|
| JP | 2001-024840 A | 1/2001 |
| JP | 2002-374378 A | 12/2002 |

OTHER PUBLICATIONS

IEEE802.3 CSMA/CD (ETHERNET) http://grouper.ieee.org/groups/802/3/<http://grouper.ieee.org/groups/802/3/>.
Universal Serial Bus (USB) http://www.usb.org/faq/<http://www.usb.org/faq/>.

* cited by examiner

*Primary Examiner* — King Poon
*Assistant Examiner* — Iriana Cruz
(74) *Attorney, Agent, or Firm* — Canon U.S.A., Inc. IP Division

(57) ABSTRACT

A facsimile apparatus has a line interface for facsimile communication and is capable of communicating with a host computer through a remote host computer interface or a local host computer interface. The facsimile apparatus includes a facsimile data transferring unit for transferring facsimile data to the host computer through the remote host computer interface or the local host computer interface; an interface recognizing unit for recognizing the host computer interface that is connected from among the remote host computer interface and the local host computer interface; a transfer destination registering unit for registering a destination of the host computer to which the facsimile data transferring unit transfers the facsimile data through the remote host computer interface when the interface recognizing unit recognizes that the remote host computer interface is connected.

21 Claims, 7 Drawing Sheets

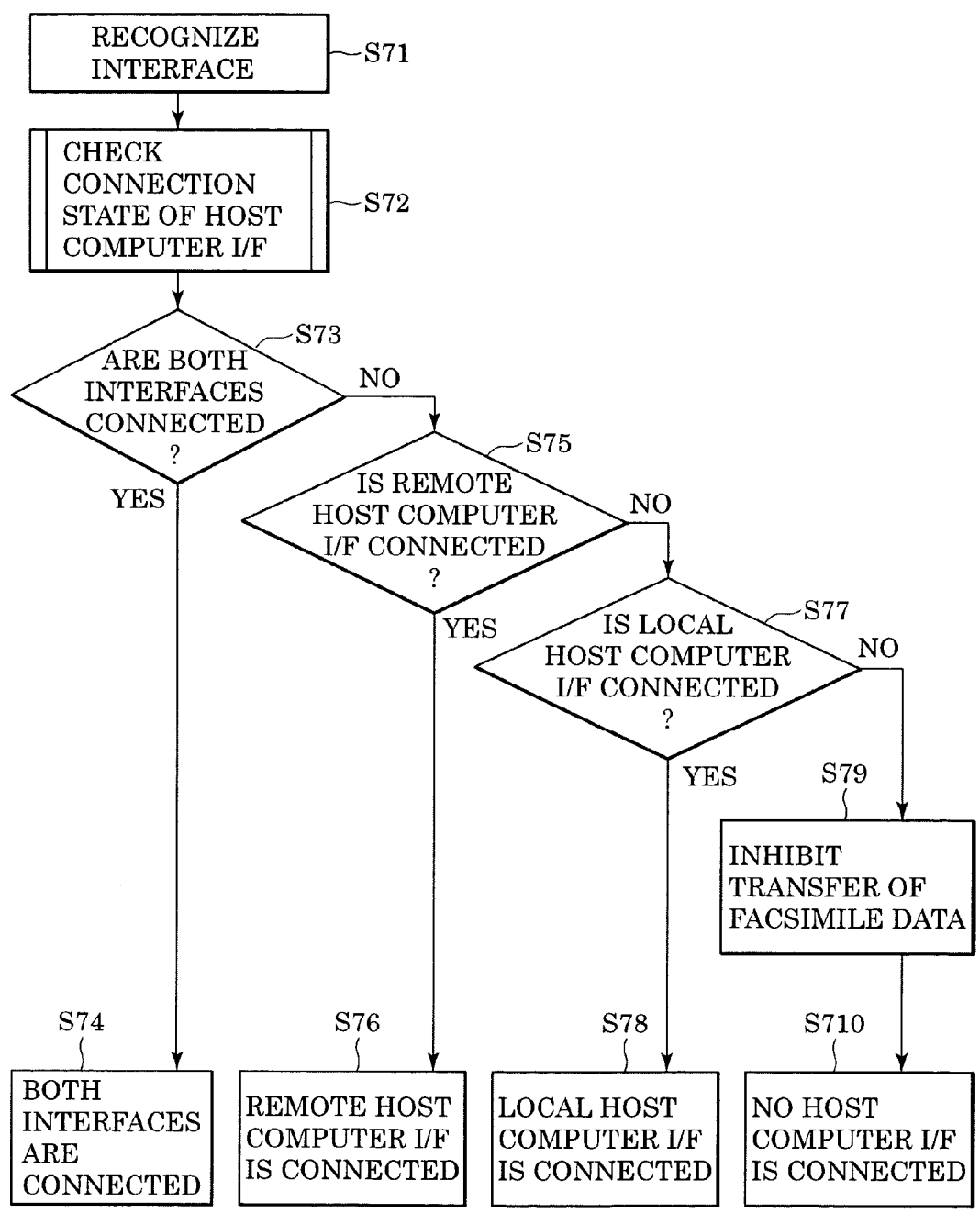

FACSIMILE APPARATUS, CONTROL METHOD THEREOF, AND CONTROL PROGRAM THEREOF

BACKGROUND OF THE INVENTION

1. Field of the Invention

The present invention relates to a facsimile apparatus that has a line interface for facsimile communication and that is capable of communicating with a host computer through a remote host computer interface or a local host computer interface, a control method of the facsimile apparatus, and a control program of the facsimile apparatus.

2. Description of the Related Art

Facsimile apparatuses are in widespread use as communication apparatuses capable of easily transmitting and/or receiving image data. Conventional facsimile apparatuses communicate over a public switched telephone network (PSTN). In contrast, technologies for facsimile communication over an internet protocol (IP) network, such as the Internet, have become common in recent years. Facsimile apparatuses that communicate over both the PSTN and the IP network are also known.

Furthermore, technologies of connecting facsimile apparatuses to host computers through remote host computer interfaces for connecting to local area networks (LANs) using, for example, carrier sense multiple access with collision detection (CSMA/CD) (refer to IEEE 802.3 CSMA/CD (ETHERNET) http://grouper.ieee.org/groups/802/3/) or through local host computer interfaces conforming to universal serial bus (USB) (refer to UNIVERSAL SERIAL BUS: http://www.usb.org/faq/), recommended standard 232 version C (RS232C), or the like are known. Internet-connection facsimile apparatuses communicating with host computers using these technologies have begun to be common. Such Internet-connection facsimile apparatuses can transfer received facsimile data to the host computers that can manage the facsimile data.

However, when the Internet-connection facsimile apparatus is to be provided with both the remote host computer interface, such as the LAN, and the local host computer interface conforming to the USB, the RS232C, or the like, a user, a manager, or a service person must refer to the manual or the like to determine which host computer the facsimile apparatus is connected to and through which host computer interface and to manually perform a complicated setting operation based on his/her knowledge and determination.

SUMMARY OF THE INVENTION

In order to solve the problem described above, the present invention provides an Internet-connection facsimile apparatus, having both a remote host computer interface, such as a LAN, and a local host computer interface conforming to USB, RS232C, or the like. The Internet-connection facsimile apparatus is capable of performing an optimal transfer of facsimile data in accordance with the connection state of each of the host computer interfaces without requiring a complicated setting operation.

The Internet-connection facsimile apparatus according to the present invention, having both the remote host computer interface, such as the LAN, and the local host computer interface conforming to the USB, the RS232C, or the like can advantageously perform an optimal transfer of facsimile data in accordance with the connection state of each of the host computer interfaces without requiring a complicated setting operation.

According to an aspect of the present invention, a facsimile apparatus that has a line interface for facsimile communication and that is capable of communicating with a host computer through a host computer interface connected through a remote host computer interface or a local host computer interface is provided. The facsimile apparatus includes a facsimile data transferring unit for transferring facsimile data to the host computer through the remote host computer interface or the local host computer interface; an interface recognizing unit for recognizing to which among the remote host computer interface and the local host computer interface the host computer interface is connected; and a transfer destination registering unit for registering a destination of the host computer to which the facsimile data transferring unit transfers facsimile data through the remote host computer interface when the interface recognizing unit recognizes that the host computer interface is connected to the remote host computer interface.

According to another aspect of the present invention, a control method of a facsimile apparatus that has a line interface for facsimile communication and that is capable of communicating with a host computer through a remote host computer interface and a local host computer interface is provided. The control method includes steps of recognizing the host computer interface that is connected to the host computer from among the remote host computer interface and the local host computer interface; registering a transfer destination of the host computer to which facsimile data is to be transferred through the remote host computer interface when it is recognized that the remote host computer interface is connected; and transferring facsimile data to the host computer interface recognized among the remote host computer interface and the local host computer interface.

Further advantages of the present invention will become apparent from the following description of the embodiments with reference to the attached drawings.

BRIEF DESCRIPTION OF THE DRAWINGS

FIG. 7 is a flowchart showing a communication control process of the facsimile apparatus in FIG. 1 (a process of detecting the connection state of the interfaces of the host computer).

DESCRIPTION OF THE EMBODIMENTS

Embodiments of an Internet-connection facsimile apparatus having both a remote host computer interface, such as a LAN, and a local host computer interface conforming to USB, RS232C, or the like will be described.

Figure 1:
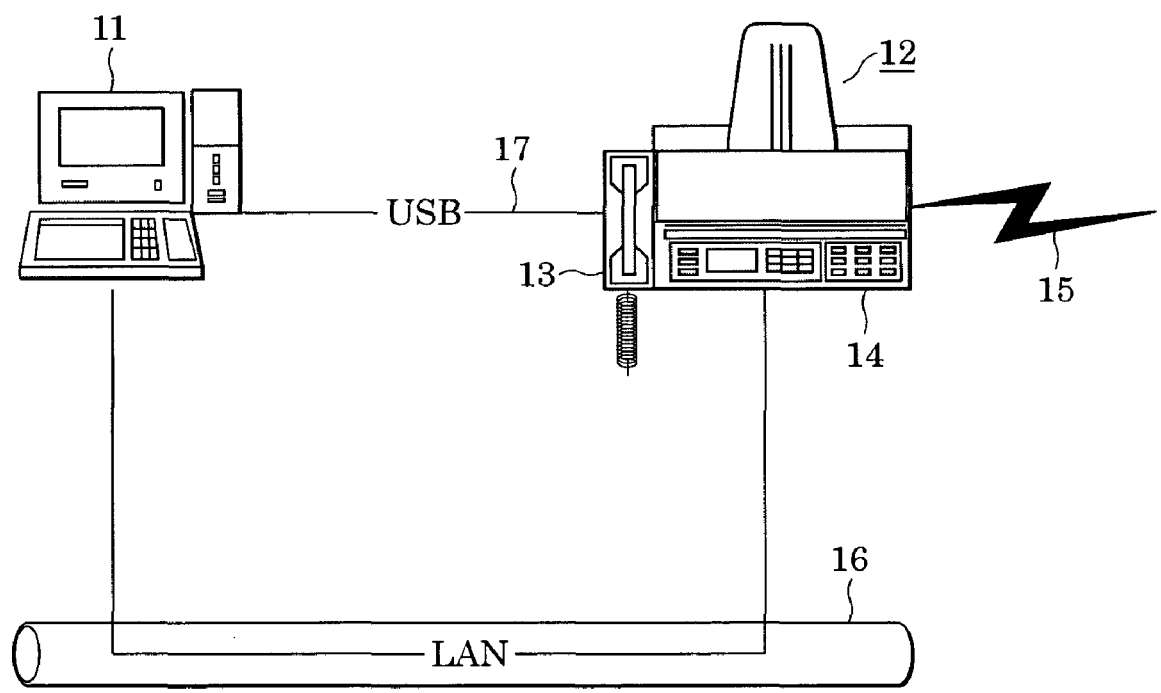
FIG. 1 illustrates an example of the connection structure of an Internet-connection facsimile apparatus and a host computer according to an embodiment of the present invention.

FIG. 1 illustrates an example of the connection structure of an Internet-connection facsimile apparatus 12 and a host computer 11 according to an embodiment of the present invention.

The Internet-connection facsimile apparatus 12 provided with a handset for speech 13 and an operation unit 14 including a display and an operation panel described below has both a LAN interface (for example, a CSMA/CD interface) serving as a remote host computer interface for connection to a LAN 16 and a USB interface (or RS232C interface) serving as a local host computer interface for connection to a USB 17. The facsimile apparatus 12 is remotely connected to the host computer 11 through the LAN interface or is locally connected to the host computer 11 through the USB interface.

The facsimile apparatus 12 establishes facsimile communication through a communication line 15. The path through which the facsimile apparatus 12 establishes the facsimile communication may be an IP network or a PSTN (a public switched telephone network such as an ISDN (integrated services digital network)). The communication line 15 may be the PSTN or the IP network such as an ADSL (asymmetric digital subscriber line) or a FTTH (fiber to the home). It is hereinafter assumed that the communication line 15 is a PSTN for simplification.

Figure 2:
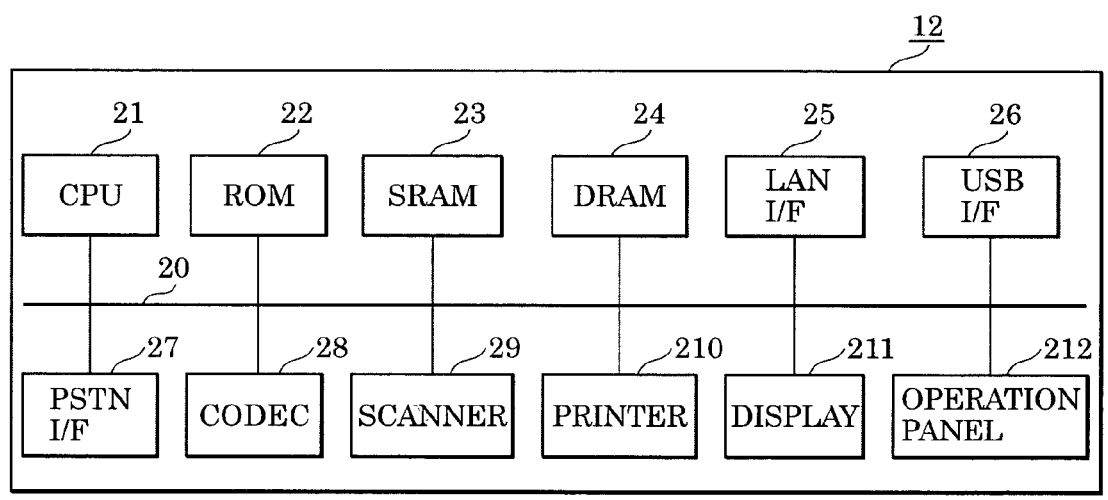
FIG. 2 is a block diagram of the facsimile apparatus in FIG. 1.

FIG. 2 is a block diagram showing the hardware structure of the facsimile apparatus 12 shown in FIG. 1. As shown in FIG. 2, the control system of the facsimile apparatus 12 is structured by connecting hardware blocks described below to a system bus 20.

A CPU 21, which is, for example, a microprocessor, controls the entire operation of the facsimile apparatus 12 by executing a control program described below.

A read-only memory (ROM) 22 stores programs executed by the CPU 21. The ROM 22 is, for example, a read-only medium, such as a mask ROM, or a rewritable medium, such as a flash ROM or a hard disk. The control program described below is stored in the ROM 22.

A static random access memory (SRAM) 23 is a rewritable medium for storing communication management information and setting information of the facsimile apparatus 12. The memory content of the SRAM 23 is backed up by using a power supply including a battery, as required.

A dynamic random access memory (DRAM) 24 is a rewritable medium used as an image memory used in the Internet-connection facsimile apparatus 12 or a working memory when the programs described below run.

A LAN interface 25, which is, for example, a CSMA/CD interface, controls the remote host computer interface. The LAN 16 is connected to the LAN interface 25.

A USB interface 26 controls the local host computer interface. The USB 17 is connected to the USB interface 26.

A PSTN interface 27 communicates with the interface of the PSTN (the communication line 15 in FIG. 1). The PSTN interface 27 is, for example, a facsimile modem or a network control unit (NCU).

A coder-encoder (CODEC) 28 performs encoding/decoding required for facsimile transmission/reception of image data. Encoding/decoding formats adopted in the CODEC 28 include an MH (Modified Huffman), MR (Modified Read), and MMR (Modified Modified Read) formats used in G3 facsimile and a JPEG format used in color facsimile communication.

A scanner 29, which includes a document feeding system, an optical sensor, and so on, scans a document image.

A printer 210 outputs the image data. The printer 210 includes a printer engine having an arbitrary recording format, such as an ink-jet printer engine or an electrophotographic printer engine.

A display 211 displays the content of the operation performed by the facsimile apparatus 12 or an operation status of the facsimile apparatus 12.

An operation panel 212 constitutes a user interface of the facsimile apparatus 12 along with the display 211. The operation panel 212 is provided with a keyboard having various function keys and a numerical keypad.

Although only the PSTN interface 27 is shown in FIG. 2 as an interface with the communication line 15 in FIG. 1, the advantages of the present invention can be achieved even when the PSTN interface 27 is replaced with an ISDN interface or the like. Both the PSTN interface 27 and an ISDN interface may be provided. Alternatively, when the facsimile communication is performed over an IP network, the interface with the communication line 15 may be an interface such as the ADSL or the FTTH.

Although the display 211 is separated from the operation panel 212 in FIG. 2, the advantages of the present invention can be achieved even when the display 211 is integrated with the operation panel 212 as in a touch display.

Figure 3:
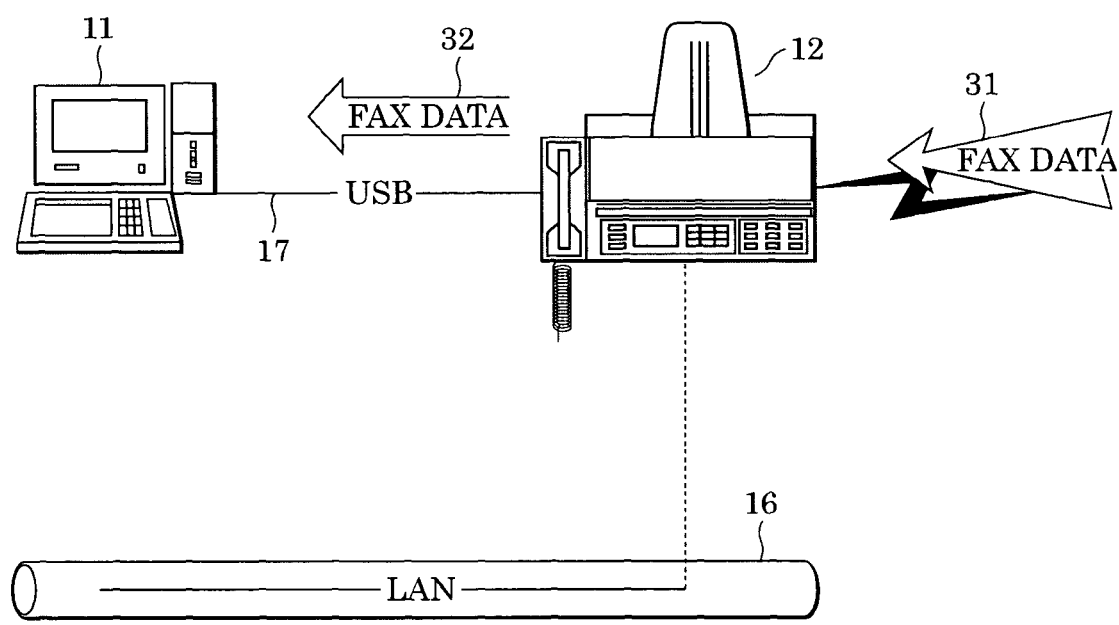
FIG. 3 shows a, case in which the facsimile apparatus in FIG. 1 transfers facsimile data to the host computer through a local host computer interface.
Figure 4:
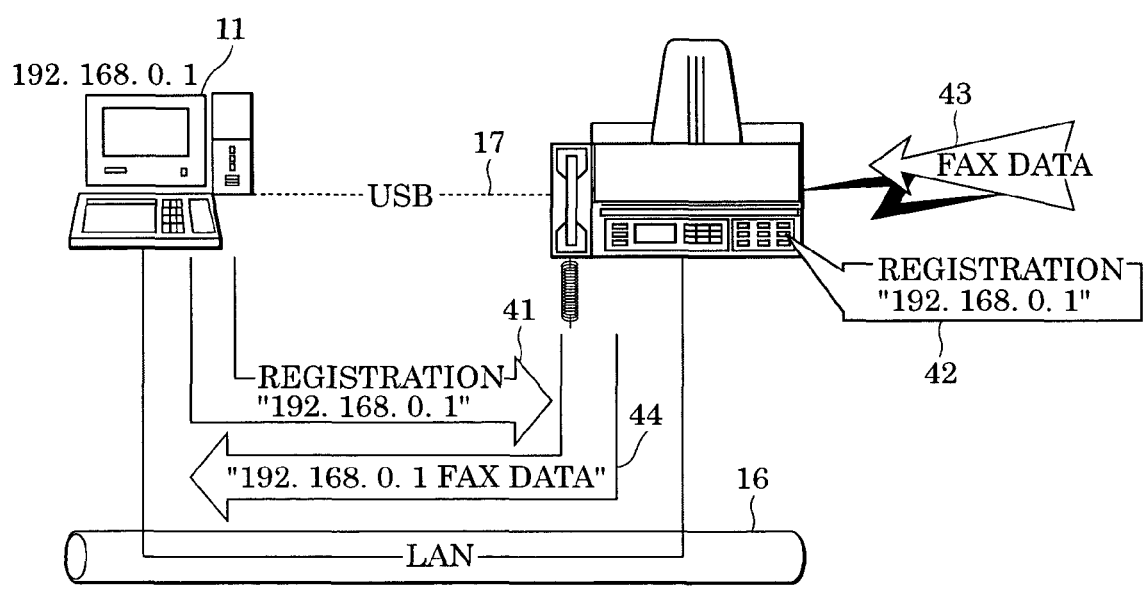
FIG. 4 shows a case in which the facsimile apparatus in FIG. 1 transfers the facsimile data to the host computer through a remote host computer interface.

FIGS. 3 and 4 show the Internet-connection facsimile apparatus 12, in FIGS. 1 and 2, which transfers facsimile data to the host computer 11. FIG. 3 shows a case in which the facsimile data is transferred to the host computer 11 through a local host computer interface (the USB 17). FIG. 4 shows a case in which the facsimile data is transferred to the host computer 11 through a remote host computer interface (the LAN 16).

Referring to FIG. 3, with the local host computer interface (the USB 17) being connected to the facsimile apparatus 12, the facsimile data received (31) by the facsimile apparatus 12 through the communication line 15 is transferred (32) to the host computer 11 through the local host computer interface (the USB 17).

Referring to FIG. 4, with the remote host computer interface (the LAN 16) being connected to the facsimile apparatus 12, the transfer destination of the facsimile data is registered in the facsimile apparatus 12. This registration is performed in the host computer 11 (41) or in the operation unit 14 of the facsimile apparatus 12 (42). When the transfer destination is registered in the host computer 11 (41), the host computer 11 communicates with the facsimile apparatus 12 using a predetermined protocol through the remote host computer interface (the LAN 16) to transfer the registered data from the host computer 11 to the facsimile apparatus 12. After the transfer destination is registered, the IP address (and/or the host name) of the host computer 11 is registered in the memory (for example, the SRAM 23 or the DRAM 24) in the facsimile apparatus 12. In the example shown in FIG. 4, the IP address "192.168.0.1" of the host computer 11 is registered as the transfer destination of the facsimile data.

When the facsimile apparatus 12 receives (43) the facsimile data through the communication line 15 during the registration, the facsimile apparatus 12 transfers (44) the facsimile data to the host computer 11 through the remote host computer interface (the LAN 16).

Communication control in the above structure is described next.

Figure 5:
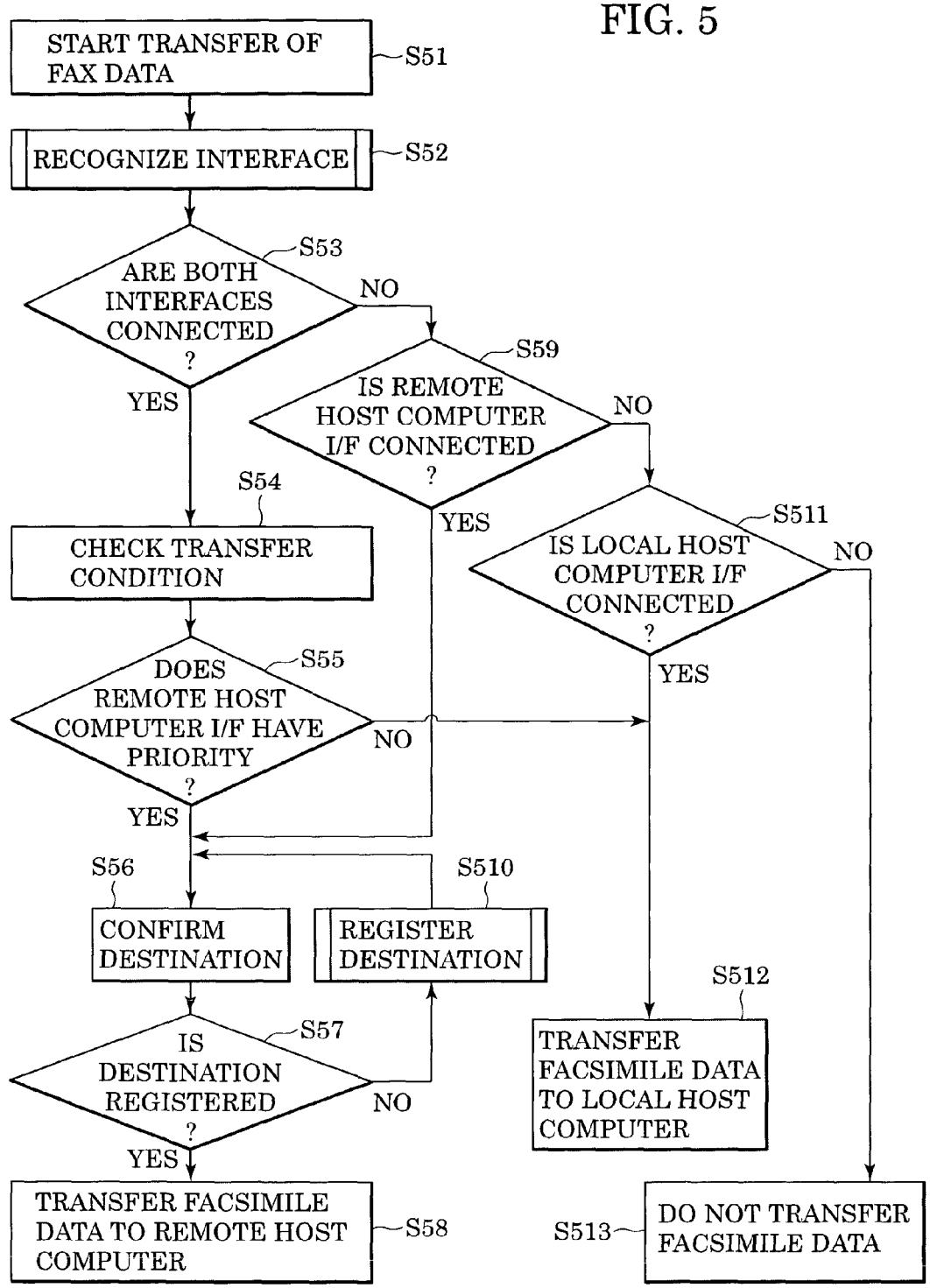
FIG. 5 is a flowchart showing a communication control process of the facsimile apparatus in FIG. 1 (a process of transferring the facsimile data).
Figure 6:
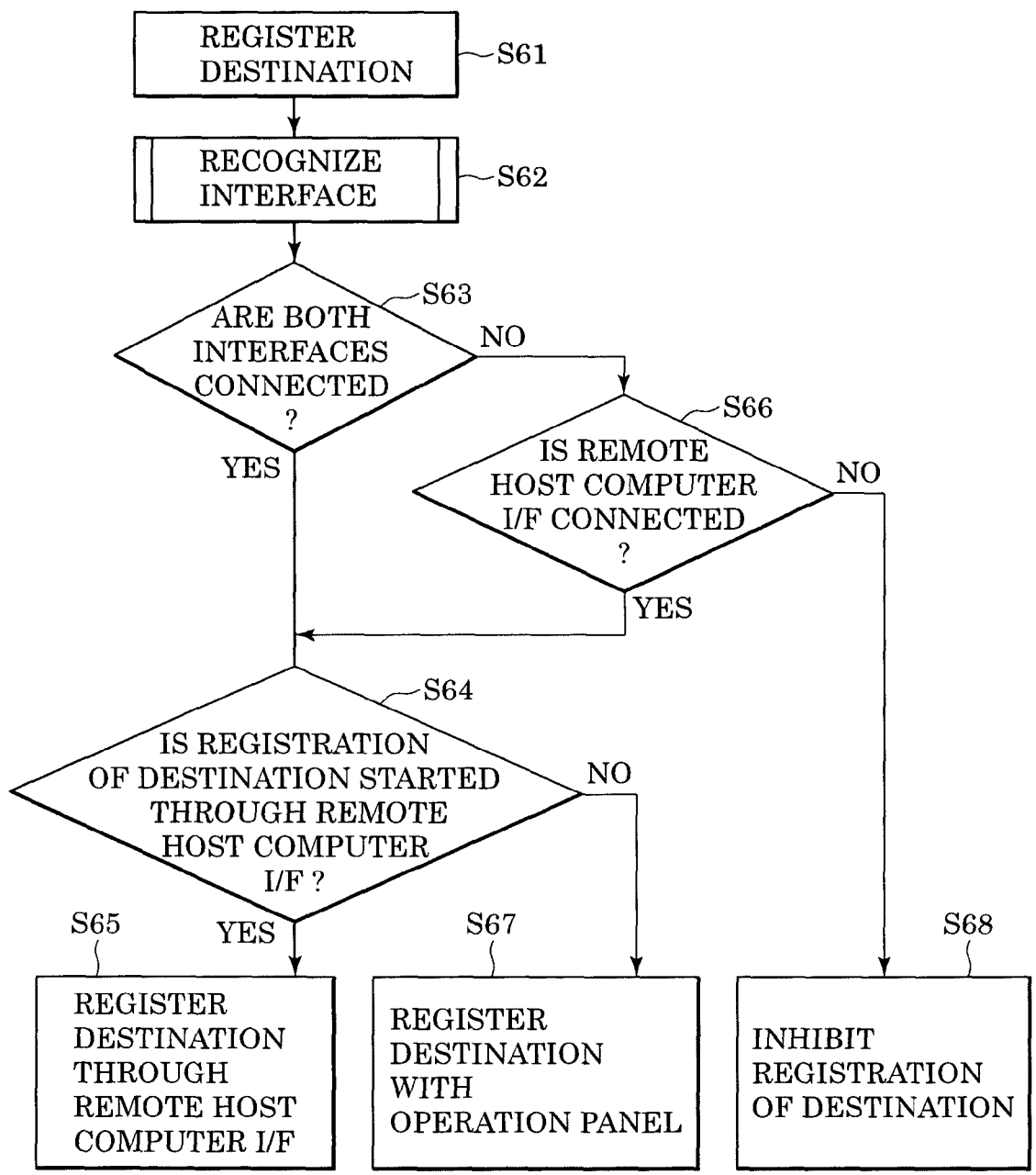
FIG. 6 is a flowchart showing a communication control process of the facsimile apparatus in FIG. 1 (a process of registering the transfer destination of the facsimile data).

FIGS. 5, 6, and 7 are flowcharts showing control processes in the facsimile apparatus 12 having the structure described above. FIG. 5 is a flowchart showing a process of transferring facsimile data. FIG. 6 is a flowchart showing a process of registering the transfer destination of the facsimile data. FIG.

7 is a flowchart showing a process of detecting the connection state of interfaces of the host computer. The control processes shown in FIGS. 5 to 7 are stored in the ROM 22 or the like as the control program of the CPU 21. The stored control program is executed by the CPU 21.

Referring to FIG. 5, in Step S51, after the facsimile data is received through the PSTN interface 27 (or an ISDN interface), the process starts to transfer the received facsimile data. The facsimile reception is performed in accordance with a known G3 or G4 facsimile standard. The received image data and facsimile management data (for example, management information such as the communication date and time, the communication target, or communication results) relating to the image data are stored in a predetermined area in the DRAM 24.

The control process performed when the facsimile data is transferred to the host computer 11 immediately after the facsimile reception is exemplified in this embodiment.

In Step S52, the process recognizes a host computer interface (a local host computer interface, such as the USB 17, or a remote host computer interface, such as the LAN 16) connected to the facsimile apparatus 12. The process determines, here, whether the local or remote host computer interface is connected and is activated (the local host computer interface, such as the USB 17, or the remote host computer interface, such as the LAN 16, can be installed in a form of, for example, a detachable card). The step of recognizing the interface in Step S52 (or Step 62 described below) is described in detail below with reference to FIG. 7.

In Step S53, the process determines the result of the recognition in Step S52. If the process determines that both the remote and local host computer interfaces are connected to the facsimile apparatus 12, in Step S54, the process checks the transfer condition, that is, checks whether the facsimile data is transferred through the local host computer interface or the remote host computer interface. Although a host computer interface through which the facsimile data is transferred has been set in advance in the facsimile apparatus 12 before shipment, the setting can be switched. When the setting is changed, a user registers the set host computer interface in the memory (for example, the SRAM 23 or the DRAM 24) by performing a predetermined registration operation with the operation unit 14.

In Step S55, the process determines whether the remote host computer interface has priority. If the remote host computer interface has priority over the local host computer interface, in Step S56, the process confirms that the destination of the remote host computer is registered in the process of registering the transfer destination in FIG. 4.

In Step S57, the process determines the result of the confirmation. If the process determines that the destination of the remote host computer to which the facsimile data is to be transferred is registered, in Step S58, the process controls the LAN interface 25 to transfer the received facsimile data to the remote host computer. A data transfer protocol, such as a simple mail transfer protocol (SMTP) or a file transfer protocol (FTP), or a transmission control protocol/Internet protocol (TCP/IP) or a user datagram protocol/Internet protocol (UDP/IP), can be used as the communication protocol with the host computer.

If the process determines in Step S57 that the destination of the remote host computer is not registered, in Step S510, the process registers the destination of the remote host computer and repeats Steps S56 to S58. The step of registering the destination of the remote host computer in Step S510 is described in detail below with reference to FIG. 6.

If the process determines in Step S55 that the local host computer interface has priority over the remote host computer interface, in Step S512, the process controls the USB interface 26 to transfer the facsimile data to the local host computer.

If the process determines in Step S53 that both the remote and local host computer interfaces are not connected to the facsimile apparatus 12, in Step S59, the process determines whether the remote host computer interface is connected to the facsimile apparatus 12.

If the process determines that the remote host computer interface is connected, the process performs Steps S56 to S58 to transfer the received facsimile data to the remote host computer that is registered as the transfer destination through the LAN interface 25.

If the process determines in Step S59 that the remote host computer interface is not connected, in Step S511, the process determines whether the local host computer interface is connected.

If the process determines that the local host computer interface is connected, in Step S512, the process controls the USB interface 26 to transfer the facsimile data to the local host computer.

If the process determines in Step S511 that the local host computer interface is not connected, the process proceeds to Step S513 and does not perform the transfer of the received facsimile data.

FIG. 6 is a flowchart showing an example of the process of registering the destination of the remote host computer to which the facsimile data is to be transferred (Step S510 in FIG. 5 described above).

In step S61, the process starts to register the destination of the remote host computer. In Step S62, the process recognizes the host computer interface connected to the facsimile apparatus. The step of recognizing the host computer interface in Step S62 (described below with reference to FIG. 7) is performed in the same manner as in Step S52 described above.

In Step S63, the process determines the result of the recognition. If the process determines that both the remote and local host computer interfaces are connected, the process precedes to Step S64.

In Step S64, the process determines whether the registration of the transfer destination of the facsimile data is started from the remote host computer through path 41 shown in FIG. 4, that is, through the remote host computer interface. The determination of whether the registration of the transfer destination of the facsimile data from the remote host computer is received is set in the memory (for example, the SRAM 23 or the DRAM 24) by performing in advance a predetermined registration operation with the operation unit 14 of the facsimile apparatus 12. When non-reception of the registration is set, the registration process may be rejected to complete the process.

If the process determines in Step S64 that the registration of the transfer destination of the facsimile data is started from the remote host computer through the remote host computer interface, in Step S65, the process controls the LAN interface 25 to register the destination of the remote host computer through the remote host computer interface (the LAN 16). At this point, the host computer 11 communicates with the facsimile apparatus 12 using a predetermined protocol through the remote host computer interface (the LAN 16) to transfer the registered data from the host computer 11 to the facsimile apparatus 12. Accordingly, identification information, such as the IP address, of the host computer 11 is registered in the memory (for example, the SRAM 23 or the DRAM 24) in the facsimile apparatus 12 as the transfer destination of the facsimile data.

For example, a hyper text transfer protocol (HTTP) may be used as the communication protocol between the host computer 11 and the facsimile apparatus 12 in the actual registration of the transfer destination. A user interface, for example, a user interface using a Web browser, may be used in the host computer 11 in the registration of the transfer destination.

When such a user interface is used, the registration of the transfer destination can be started by accessing the HTTP port of the IP address of the facsimile apparatus 12 by using the Web browser from the host computer 11 side. An HTTP server function is implemented in the facsimile apparatus 12 and the user interface for registering the transfer destination is provided in the facsimile apparatus 12 as Web content.

The facsimile apparatus 12 is controlled such that the connection with the host computer 11 for registering the facsimile transfer destination is established only when the facsimile apparatus 12 has the LAN connection.

If the process determines in Step S64 that the registration of the destination of the remote host computer is not started through the remote host computer interface, in Step S67, the process controls the display 211 and the operation panel 212, as shown by path 42 in FIG. 4, to register the destination of the remote host computer. For example, a predetermined user interface using menus and dialog boxes is displayed in the display 211 and a predetermined operation is performed with the operation panel 212 to register the identification information, such as the IP address, of the host computer 11 as the transfer destination of the facsimile data.

In addition, if the registration of the destination is started through the local host computer interface in Step S64, the destination may be registered from the host computer 11 through the USB 17.

If the process determines in Step S63 that both the remote and local host computer interfaces are not connected, in Step S66, the process determines whether (at least) the remote host computer interface is connected. If (only) the remote host computer interface is connected, the process proceeds to Step S64 to perform Steps S64 and S65 or Steps S64 and S67.

If the process determines in Step S66 that the remote host computer interface is not connected, in Step S68, the process inhibits the registration of the destination of the remote host computer.

FIG. 7 is a flowchart showing an example of the step of recognizing the remote and/or local host computer interfaces in Step S52 or Step S62 described above.

Referring to FIG. 7, in Step S71, the process recognizes the connection of the host computer interface. In Step S72, the process controls the LAN interface 25 and the USB interface 26 to check the connection state of the host computer interface connected to the facsimile apparatus 12. Since the local host computer interface, such as the USB 17, or the remote host computer interface, such as the LAN 16, can be installed in a form of, for example, a detachable card, the process determines, here, whether the local or remote host computer interface is connected and is activated.

In Step S73, the process determines whether both the remote host computer interface and the local host computer interface are connected. If the process determines that both the remote host computer interface and the local host computer interface are connected, in Step S74, the process recognizes that both the remote host computer interface and the local host computer interface are connected.

If the process determines in Step S73 that both the remote host computer interface and the local host computer interface are not connected, it is assumed that either of the remote host computer interface or the local host computer interface is connected. In this case, in Step S75, the process determines whether the remote host computer interface is connected.

If the process determines that the remote host computer interface is connected, in Step S76, the process recognizes that only the remote host computer interface is connected.

If the process determines in Step S75 that the remote host computer interface is not connected, in Step S77, the process determines whether the local host computer interface is connected.

If the process determines that the local host computer interface is connected, in Step S78, the process recognizes that only the local host computer interface is connected.

If the process determines in Step S77 that the local host computer interface is not connected, it is assumed that neither the remote host computer interface nor the local host computer interface is connected. Hence, in Step S79, the process inhibits the transfer of the received facsimile data from the facsimile apparatus 12. In Step S710, the process recognizes that the no host computer interface is connected.

The recognition result in Steps S74, S76, S78, or S710 is stored as a flag in the memory (for example, the SRAM 23 or the DRAM 24). The information of the flag is detected in Steps S53, S59, and S511 in FIG. 5 or in Steps S63 and S66 in FIG. 6 to determine the connection state.

According to the embodiments described above, the Internet-connection facsimile apparatus having both the remote host computer interface, such as the LAN, and the local host computer interface conforming to the USB, the RS232C, or the like registers the destination of the host computer to which the facsimile data is to be transferred in accordance with the connection state of the host computer interface. Accordingly, there is no need for a user, a manger, or a service person to perform a complicated setting process based on his/her knowledge and determination as to which host computer the facsimile apparatus is connected and through which host computer interface. The facsimile apparatus according to the present invention has the advantage of the automatic and reliable transfer of the facsimile data to an appropriate destination in accordance with the connection state of each host computer interface.

The transfer destination of the facsimile data is registered in accordance with the connection state of the host computer interface. When the remote host computer interface is also connected, the destination of the facsimile data is remotely registered from the host computer side. When only the local host computer interface is connected, there is no need to register the transfer destination and the facsimile data is transferred to the host computer connected to the local host computer interface.

Particularly, the remote registration of the transfer destination from the host computer can be controlled such that the start or reception of the registration is allowed only when the remote host computer interface is connected. Hence, the data processing can be efficiently performed and the network security can be improved.

When it is recognized that both the local host computer interface and the remote host computer interface are connected, the host computer interface through which the facsimile data is transferred, among the local and remote host computer interfaces, can be registered, that is, the priority of the host computer interfaces can be registered. Accordingly, fine connection control can be achieved depending on a user's demand, such as a demand for a decreased priority level of the connection with a remote host computer for security.

Connection with the local host computer interface or the remote host computer interface may be allowed and connection with the other host computer interface may be inhibited. In such a case, fine connection control can be achieved depending on a user's demand, such as a demand for inhibited connection with a remote host computer for security.

When it is recognized that neither the local host computer interface nor the remote host computer interface is connected, the process of registering the transfer destination is inhibited and the process of transferring the facsimile data is also inhibited. Accordingly, it is possible to inhibit a meaningless process, for example, the process of registering the transfer destination or the process of transferring the facsimile data, which can cause a problem of network security, when neither the local host computer interface nor the remote host computer interface is connected.

The present invention can be applied to an arbitrary communication apparatus, regardless of its shape, as long as the communication apparatus has a line interface for facsimile communication and includes a facsimile communication mechanism capable of communicating with the host computer through the remote host computer interface or the local host computer interface. For example, the present invention can be applied to a so-called complex image processing system that not only performs the facsimile communication but also reproduces or records images. The control method or program according to the present invention can be installed in the hardware of a personal computer through an appropriate storage medium or over a network.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-396485 filed Nov. 27, 2003, which is hereby incorporated by reference herein.

What is claimed is:

1. A facsimile apparatus that has a line interface for facsimile communication and that is capable of communicating with a host computer through a remote host computer interface and a local host computer interface, the facsimile apparatus comprising:
   an interface recognizing unit for recognizing whether the facsimile apparatus is connected to the host computer through the remote host computer interface, and for recognizing whether the facsimile apparatus is connected to the host computer through the local host computer interface;
   a facsimile data transferring unit for transferring facsimile data to the host computer through the remote host computer interface at least in a case that the interface recognizing unit recognizes that the facsimile apparatus is connected to the host computer through the remote host computer interface and recognizes that the facsimile apparatus is not connected to the host computer through the local host computer interface, and for transferring facsimile data to the host computer through the local host computer interface at least in a case that the interface recognizing unit recognizes that the facsimile apparatus is connected to the host computer through the local host computer interface and recognizes that the facsimile apparatus is not connected to the host computer through the remote host computer interface;
   a receiving unit for receiving identification information of the host computer connected through the remote host computer interface, from a host computer connected through the local host computer interface;
   a storing unit for storing the received identification information of the host computer as a transfer destination of the facsimile data; and
   a registration unit for registering the transfer destination in the storing unit in a case that the interface recognizing unit recognizes that the facsimile apparatus is connected to the host computer through the remote host computer interface and not performing registering of the transfer destination in the storing unit in a case that the interface recognizing unit recognizes that the facsimile apparatus is not connected to the host computer through the remote host computer interface.

2. The facsimile apparatus according to claim 1, wherein the registration unit requests that a user of the host computer registers the transfer destination through a remote user interface used in communication with the host computer through the remote host computer interface.

3. The facsimile apparatus according to claim 1, wherein the registration unit requests that a user registers the transfer destination through a local user interface using an operation unit.

4. The facsimile apparatus according to claim 1, wherein in the case that the interface recognizing unit recognizes that the facsimile apparatus is connected to the host computer through the local host computer interface and recognizes that the facsimile apparatus is not connected to the host computer through the remote host computer interface, the registration unit inhibits registration of the transfer destination by the registration unit.

5. The facsimile apparatus according to claim 1, wherein in the case that the interface recognizing unit recognizes that the facsimile apparatus is connected to the host computer through the remote host computer interface and recognizes that the facsimile apparatus is not connected to the host computer through the local host computer interface, the registration unit registers the transfer destination.

6. The facsimile apparatus according to claim 1, further comprising a host computer interface priority registering unit for registering a host computer interface priority indicating which host computer interface among the local host computer interface and the remote host computer interface the facsimile data is transferred through in a case that the interface recognizing unit recognizes that the facsimile apparatus is connected to the host computer through both the local host computer interface and the remote host computer interface.

7. The facsimile apparatus according to claim 1, wherein both registration of the transfer destination by the registration unit and the transfer of the facsimile data by the facsimile data transferring unit are inhibited in a case that the interface recognizing unit recognizes that the facsimile apparatus is not connected to the host computer through the local host computer interface and recognizes that the facsimile apparatus is not connected to the host computer through the remote host computer interface.

8. A control method of a facsimile apparatus that has a line interface for facsimile communication and that is capable of communicating with a host computer through a remote host computer interface and a local host computer interface, the control method comprising:
   recognizing whether the facsimile apparatus is connected to the host computer through the remote host computer interface, and whether the facsimile apparatus is connected to the host computer through the local host computer interface;

transferring facsimile data to the host computer through the remote host computer interface at least in a case that it is recognized in the recognizing step that the facsimile apparatus is connected to the host computer through the remote host computer interface and that the facsimile apparatus is not connected to the host computer through the local host computer interface, and transferring facsimile data to the host computer through the local host computer interface at least in a case that it is recognized in the recognizing step that the facsimile apparatus is connected to the host computer through the local host computer interface and that the facsimile apparatus is not connected to the host computer through the remote host computer interface;

receiving identification information of the host computer connected through the remote host computer interface, from a host computer connected through the local host computer interface;

storing, in a storing unit, the received identification information of the host computer as a transfer destination of the facsimile data; and registering the transfer destination in the storing unit in a case that it is recognized in the recognizing step that the facsimile apparatus is connected to the host computer through the remote host computer interface and not performing registering of the transfer destination in the storing unit in a case that it is recognized in the recognizing step that the facsimile apparatus is not connected to the host computer through the remote host computer interface.

9. The control method of the facsimile apparatus according to claim 8, wherein the registering the transfer destination comprises requesting that a user of the host computer register the transfer destination through a remote user interface used in communication with the host computer through the remote host computer interface.

10. The control method of the facsimile apparatus according to claim 8, wherein the registering the transfer destination comprises requesting that a user register the transfer destination through a local user interface using an operation unit.

11. The control method of the facsimile apparatus according to claim 8, wherein registration of the transfer destination is inhibited in the case that it is recognized in the recognizing step that the facsimile apparatus is connected to the host computer through the local host computer interface and that the facsimile apparatus is not connected to the host computer through the remote host computer interface.

12. The control method of the facsimile apparatus according to claim 8, wherein the transfer destination is registered in the case that it is recognized in the recognizing step that the facsimile apparatus is connected to the host computer through the remote host computer interface and that the facsimile apparatus is not connected to the host computer through the local host computer interface.

13. The control method of the facsimile apparatus according to claim 8, further comprising registering a host computer interface priority indicating which host computer interface among the local host computer interface and the remote host computer interface the facsimile data is transferred through in a case that it is recognized in the recognizing step that the facsimile apparatus is connected to the host computer through both the local host computer interface and the remote host computer interface.

14. The control method of the facsimile apparatus according to claim 8, wherein both registration of the transfer destination and the transfer of the facsimile data are inhibited in a case that it is recognized in the recognizing step that the facsimile apparatus is not connected to the host computer through the local host computer interface and that the facsimile apparatus is not connected to the host computer through the remote host computer interface.

15. A non-transitory computer-readable medium storing a computer program for a facsimile apparatus to perform a control method according to claim 8.

16. The facsimile apparatus according to claim 1, wherein the transfer destination is registered from the host computer through the remote host computer interface only in a case that at least both allowance information is set, the allowance information being with respect to whether or not the registration of the transfer destination through the remote host computer interface is allowed, and the interface recognizing unit recognizes that the facsimile apparatus is connected to the host computer through the remote host computer interface.

17. The facsimile apparatus according to claim 1, wherein a remote user interface is used for the registration of the transfer destination by an access from a Web browser of the host computer to an HTTP port of an IP address of the facsimile apparatus.

18. The facsimile apparatus according to claim 1, wherein the transfer destination is registered from the host computer through the local host computer interface.

19. The control method of the facsimile apparatus according to claim 8, wherein the transfer destination is registered from the host computer through the remote host computer interface only in a case that at least both allowance information is set, the allowance information being with respect to whether or not the registration of the transfer destination through the remote host computer interface is allowed, and it is recognized in the recognizing step that the facsimile apparatus is connected to the host computer through the remote host computer interface.

20. The control method of the facsimile apparatus according to claim 8, wherein a remote user interface is used for the registration of the transfer destination by an access from a Web browser of the host computer to an HTTP port of an IP address of the facsimile apparatus.

21. The control method of the facsimile apparatus according to claim 8, wherein the transfer destination is registered from the host computer through the local host computer interface.

* * * * *